(12) United States Patent
Crafts et al.

(10) Patent No.: US 8,734,006 B2
(45) Date of Patent: May 27, 2014

(54) CALIBRATION OF AN ON-DIE THERMAL SENSOR

(75) Inventors: James M. Crafts, Warren, VT (US);
Joseph E. Dery, Burlington, VT (US);
Timothy M. Skergan, Austin, TX (US);
Timothy C. Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/039,037

(22) Filed: Mar. 2, 2011

(65) Prior Publication Data

US 2012/0224602 A1    Sep. 6, 2012

(51) Int. Cl.
*G01K 15/00*    (2006.01)
*G01K 7/00*    (2006.01)

(52) U.S. Cl.
USPC .............................. 374/1; 374/170; 374/178

(58) Field of Classification Search
USPC .............................................. 374/1, 170, 178
See application file for complete search history.

(56) References Cited

U.S. PATENT DOCUMENTS

| | | | |
|---|---|---|---|
| 5,873,053 A | 2/1999 | Pricer et al. | |
| 6,786,639 B2 | 9/2004 | Covi et al. | |
| 6,888,397 B2 | 5/2005 | Tsuchiya | |
| 6,921,198 B2 | 7/2005 | Gruszecki et al. | |
| 7,102,417 B2 | 9/2006 | Gordon et al. | |
| 7,149,645 B2 | 12/2006 | Mangrulkar et al. | |
| 7,356,426 B2* | 4/2008 | Jain et al. | 702/99 |
| 7,577,539 B2 | 8/2009 | Hubanks et al. | |
| 7,674,035 B2 | 3/2010 | Pertijs et al. | |
| 2001/0021217 A1* | 9/2001 | Gunther et al. | 374/178 |
| 2003/0158683 A1 | 8/2003 | Gauthier et al. | |
| 2003/0214998 A1* | 11/2003 | Gauthier et al. | 374/141 |
| 2004/0071183 A1 | 4/2004 | Tesi et al. | |
| 2006/0190746 A1* | 8/2006 | Boerstler et al. | 713/300 |
| 2007/0191993 A1* | 8/2007 | Wyatt | 700/299 |
| 2008/0317086 A1* | 12/2008 | Santos et al. | 374/1 |
| 2009/0021314 A1* | 1/2009 | Boerstler et al. | 331/66 |
| 2009/0125267 A1* | 5/2009 | Johns et al. | 702/99 |
| 2009/0285261 A1 | 11/2009 | Casey et al. | |
| 2010/0188115 A1* | 7/2010 | von Kaenel | 326/16 |
| 2010/0213919 A1* | 8/2010 | Takayanagi et al. | 323/318 |
| 2013/0076381 A1* | 3/2013 | Takayanagi et al. | 324/750.03 |

* cited by examiner

*Primary Examiner* — Mirellys Jagan
(74) *Attorney, Agent, or Firm* — David Cain; Roberts Mlotkowski Safran & Cole, P.C.

(57) ABSTRACT

A method of calibrating a thermal sensor includes setting a wafer to a control temperature. The wafer includes the thermal sensor and other chip logic. The method also includes applying power exclusively to a thermal sensor circuit, calibrating the thermal sensor, and storing a calibration result. The method also includes retrieving the calibration result upon application of power to the other chip logic.

18 Claims, 6 Drawing Sheets

CALIBRATION OF AN ON-DIE THERMAL SENSOR

FIELD OF THE INVENTION

The invention relates to temperature detection in semiconductor structures and, more particularly, to systems and methods for calibrating an on-die thermal sensor.

BACKGROUND

Integrated circuits dissipate electrical power during operation, transforming electrical energy into heat energy. At the same time, several operating parameters of an integrated circuit typically vary with temperature, and reliable device operation within specifications occurs only within a defined operating temperature range. For high performance devices, such as microprocessors, specified performance is only achieved when the temperature of the device is below a specified maximum operating temperature. Operation of the device at a temperature above the specified maximum operating temperature may result in irreversible damage to the device. In addition, it has been established that the reliability of an integrated circuit decreases with increasing operating temperature.

On-die thermal sensors (also referred to as on-chip thermal sensors) are commonly used to detect the temperature of a portion of a semiconductor chip. For example, one or more digital thermal sensors (DTS) may be integrated into the structure of a chip (e.g., on-die) and used to detect when a particular temperature is reached at that location of the chip. Thermal-related power management decisions are based on the detection of such temperatures. For example, a processor may be designed to throttle back when a temperature of 95° C. is detected, and shut down completely when a temperature of 110° C. is detected. Thus, the on-die DTS is useful for facilitating intelligent decision making of the power-aware architecture to increase performance or throttle voltage.

A DTS is calibrated in order to accurately detect chip temperatures. Calibration of an on-die DTS typically involves subjecting a wafer containing the die to a controlled temperature, connecting the wafer to test equipment, and using a state machine to step through calibration steps to identify a voltage that corresponds to the controlled temperature.

The calibration accuracy of an on-die DTS has a direct influence on guard-bands, affecting bottom line performance in frequency and energy consumption. However, the calibration accuracy of a DTS is typically only to within about +/−5° C. Self-heating of the chip during calibration of the DTS is a particular problem that results when logic on the chip generates heat during the calibration of the DTS and this heat skews the result of the calibration measurement.

Accordingly, there exists a need in the art to overcome the deficiencies and limitations described hereinabove.

SUMMARY

In a first aspect of the invention, a method of calibrating a thermal sensor comprises setting a wafer to a control temperature. The wafer comprises the thermal sensor and other chip logic. The method also comprises applying power exclusively to a thermal sensor circuit, calibrating the thermal sensor, and storing a calibration result. The method also includes retrieving the calibration result upon application of power to the other chip logic.

In another aspect of the invention, a method of calibrating a thermal sensor comprises setting a wafer to a control temperature. The wafer comprises a die that comprises the thermal sensor, a thermal sensor circuit, and other chip logic. The method includes applying power exclusively to the thermal sensor circuit, resetting sample and hold logic contained in the thermal sensor circuit, and comparing a plurality of comparison values to a temperature detected by the thermal sensor. The method also includes setting a completion bit after performing the comparing, storing the completion bit and one of the plurality of comparison values, applying power to the other chip logic, and retrieving the one of the plurality of comparison values.

In yet another aspect of the invention, an on-die thermal sensor comprises a thermal sensor circuit comprised in a die and electrically connected to a power interconnect that is separate and isolated from other interconnects for other chip logic in the die. The thermal sensor circuit is configured to be powered exclusively of the other chip logic.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of a DTS calibration circuit, which comprises the structures of the present invention. In still further embodiments, a method in a computer-aided design system is provided for generating a functional design model of the DTS calibration circuit. The method comprises generating a functional representation of the structural elements of the DTS calibration circuit.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to temperature detection in semiconductor structures and, more particularly, to systems and methods for calibrating an on-die thermal sensor. Implementations of the invention provide an on-die DTS calibration system and method that minimize the total integrated power supplied to the chip before performing a calibration measurement, thus minimizing any heating prior to performing the calibration measurement. More specifically, and in accordance with aspects of the invention, an on-die DTS calibration measurement circuit is automated and is isolated from other circuitry in the die (e.g., chip). In embodiments, the circuit is automated in that it is self-clocked and has an internal state machine for stepping through the calibration steps, such that the circuit is completely on-chip and does not rely on external stimulus (e.g., from external test equipment) for performing the calibration measurement.

In additional embodiments, the circuit is isolated in that it is provided with a separate interconnect for power supply at the wafer level so that only the calibration circuit is powered during the calibration measurement. This permits the calibration measurement to be performed without providing power to other portions of the chip, which minimizes self-heating that can skew the calibration measurement. According to aspects of the invention, the circuit resets at power on and immediately performs the calibration measurement, and the calibration measurement results are stored after performing the calibration measurement for accessing at a later time after the remainder of the chip has been powered on. In this manner, implementations of the invention provide improved systems and methods for calibrating an on-die thermal sensor by avoiding the effects of self-heating on the calibration measurement.

Figure 1:
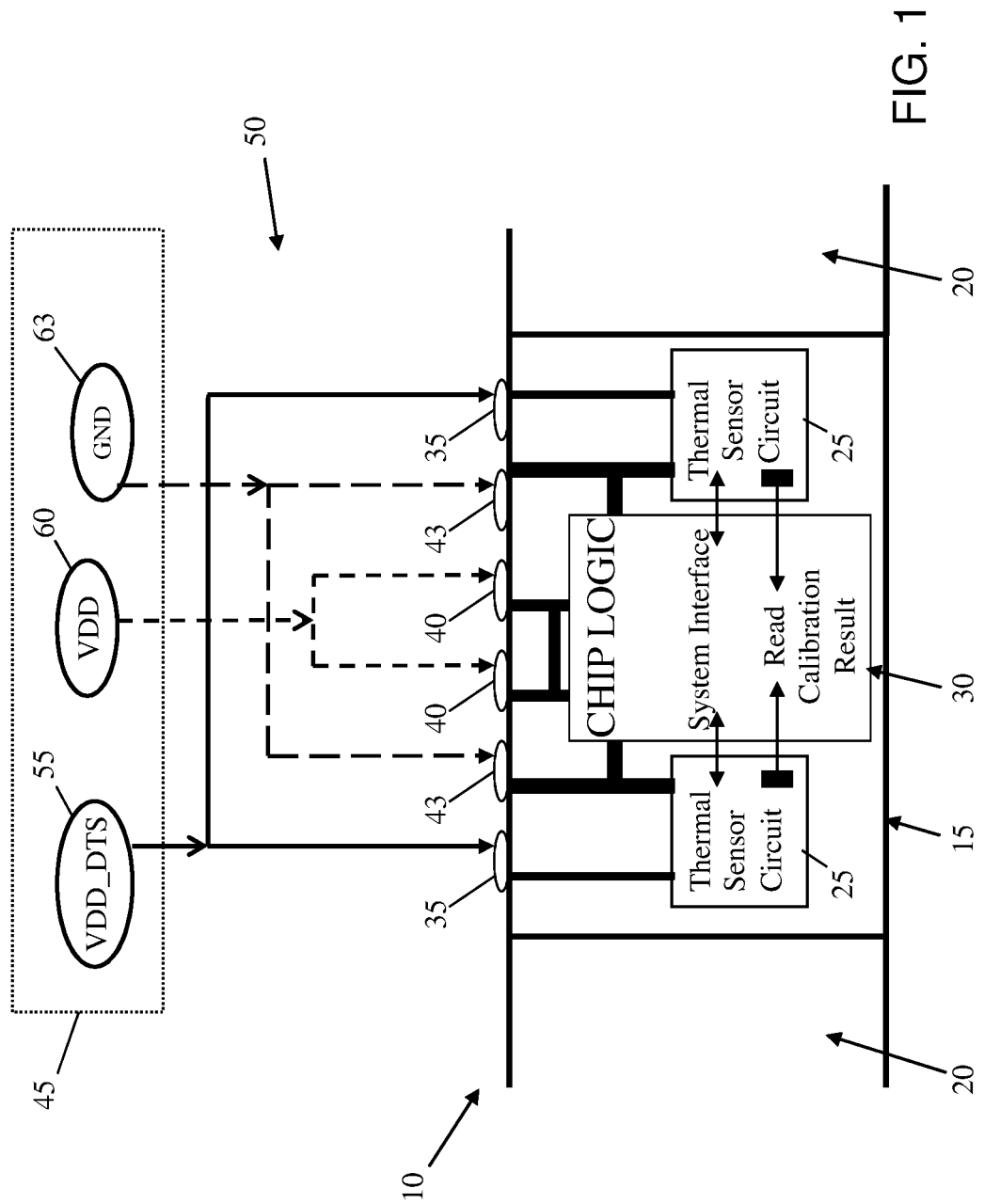
FIG. 1 shows a block diagram of a wafer at wafer test stage in accordance with aspects of the invention.

FIG. 1 shows a block diagram of a wafer 10 at wafer test stage in accordance with aspects of the invention. The wafer 10 includes a die 15 and kerfs 20 separating the die 15 from other die areas of the wafer. The die 15 includes one or more thermal sensor circuits 25 located at thermal points of interest within the die 15. The thermal sensor circuits 25 are integrated in the structure of the wafer 10, and comprise an on-die DTS calibration measurement circuit, as described in greater detail below. The die 15 also contains other chip logic 30, such as transistors, storage elements, other passive and/or active devices, etc. The thermal sensor circuits 25 and chip logic 30 may communicate as described in greater detail herein.

In accordance with aspects of the invention, the thermal sensor circuits 25 are provided with isolated power interconnects 35 that are separate from the power interconnects 40 associated with the other chip logic 30. Other interconnects 43 are provided for ground. Interconnects 35, 40, and 43 may be any desired electrical connection structure, such as C4 (controlled collapse chip connection) interconnects. As shown in FIG. 1, the wafer 10 is connected to test equipment 45 via a test probe 50 that contacts the interconnects 35, 40, and 43. The test equipment 45 may be configured, in at least one mode of operation, to supply electrical power (e.g., VDD DTS 55) only to the thermal sensor circuits 25 while not supplying electrical power (e.g., VDD 60) to the other chip logic 30, e.g., to apply power exclusively to the thermal sensor circuit 25. In this same configuration, the interconnects 43 are tied to ground (e.g., ground 63). In this manner, the thermal sensor circuits 25 may be used to perform a DTS calibration measurement when only the thermal sensor circuits 25 are powered on. Since the other chip logic 30 is not powered during the calibration measurement, there is no self-heating from the other chip logic 30 to negatively affect the calibration. The invention is not limited to using C4 interconnects, e.g., isolated power interconnects, for supplying isolated power to the calibration circuit. Instead, any suitable system may be employed for supplying isolated power to the calibration circuit, such as, for example, coupling one or more local power antennae to an external electro-magnetic field source.

Figure 2:
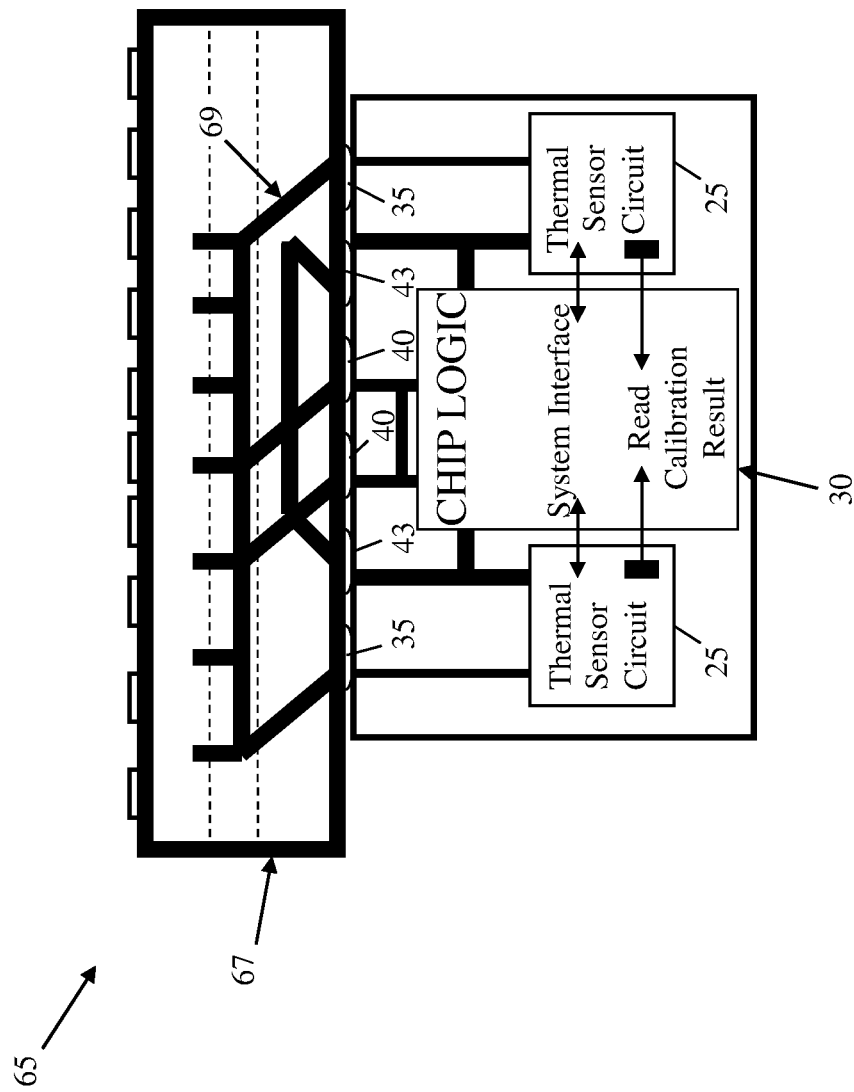
FIG. 2 shows a block diagram of a chip package in accordance with aspects of the invention.

FIG. 2 shows a block diagram of a chip package 65 in accordance with aspects of the invention. In embodiments, the thermal sensor circuits 25 are calibrated while in the configuration shown in FIG. 1, and after calibration, the die 15 is diced from the wafer and incorporated into the package 65 shown in FIG. 2. The package 65 includes a power plane 67 comprising wires 69 that electrically connect the interconnects 35 to the interconnects 40, such that the thermal sensor circuits 25 and other chip logic 30 have the same external power (e.g., VDD or off).

Figure 3:
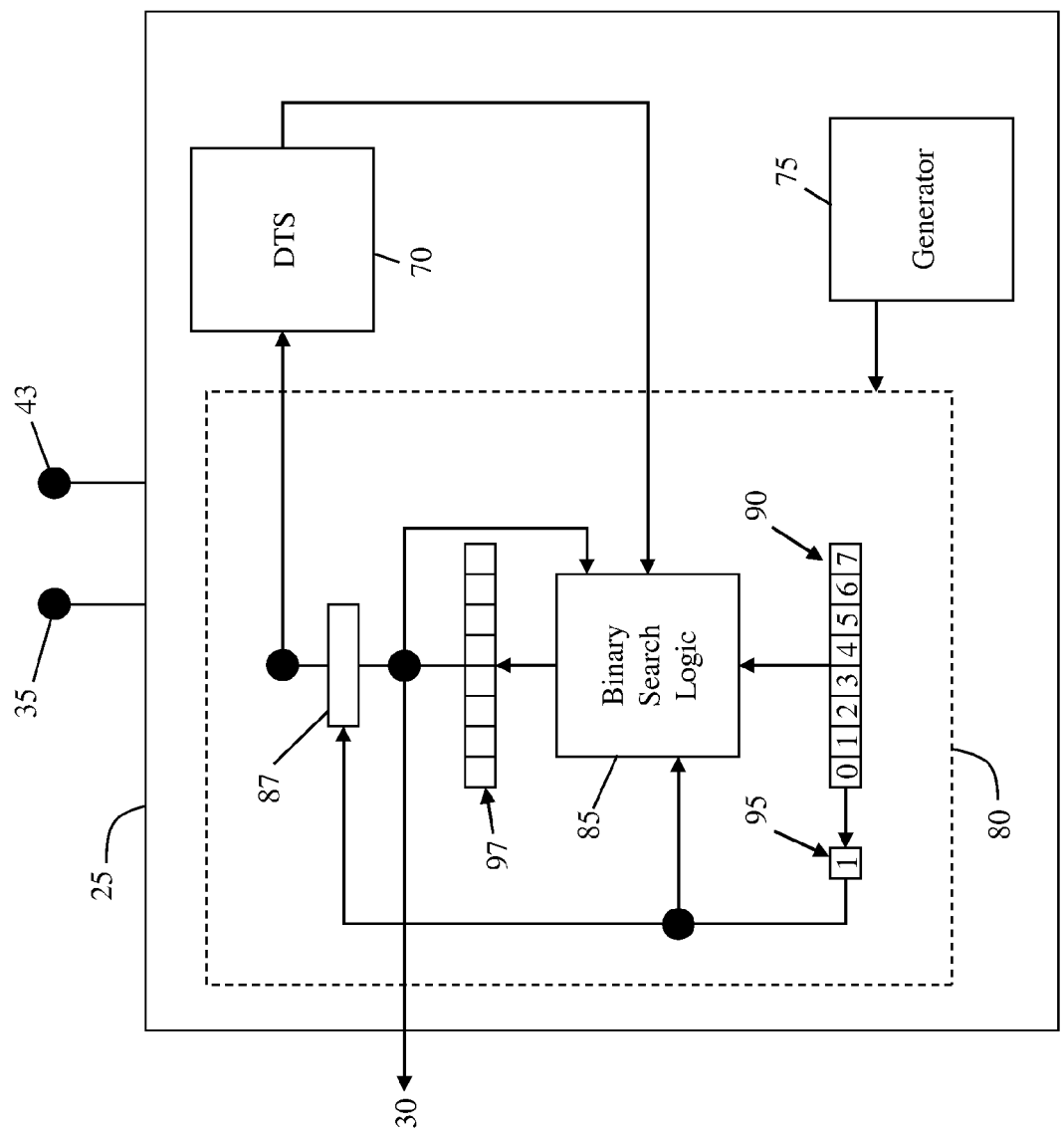
FIG. 3 shows a block diagram representing functionality of a system in accordance with aspects of the invention.

FIG. 3 shows a block diagram representing functionality of a system in accordance with aspects of the invention. In particular, FIG. 3 shows a thermal sensor circuit 25 connected to a power interconnect 35 and ground interconnect 43, which may be connected to a power supply via test equipment, e.g., as described above with respect to FIG. 1. According to aspects of the invention, the thermal sensor circuit 25 comprises a digital thermal sensor (DTS) 70, a combined power on and evaluate pulse generator 75, and sample and hold logic 80 (e.g., a thermal sensor calibration circuit). In embodiments, electrical power from the interconnect 35 sources (e.g., is supplied to) the DTS 70, the generator 75, and the sample and hold logic 80, and the other elements of the thermal sensor circuit.

In implementations, the sample and hold logic 80 begins with a power on signal that is generated by the generator 75 when power is first supplied to the thermal sensor circuit 25 through the interconnect 35. The power on signal sets an initial pre-defined logic state to the sample and hold logic 80. In embodiments, the power on signal is held by the generator 75 for an amount of time sufficient to allow the DTS 70 to stabilize. The amount of hold time depends on the implementation of the particular DTS 70, and any desired hold time may be achieved using appropriate programming/logic in the generator 75. In embodiments, the generator 75 provides a periodic digital waveform, or clock, to step the sample and hold logic 80 through binary search comparison values. Upon receipt of a pulse from the generator 75, binary search logic 85 contained in the sample and hold logic 80 generates and sends a comparison value to the DTS 70 via a gate 87.

According to aspects of the invention, the DTS 70 detects a temperature, e.g., with a thermal diode that generates an output voltage, and compares the detected temperature to the incoming comparison value received from the sample and hold logic 80. The DTS 70 is configured to output a low value (e.g., binary low or zero volts) when the comparison value is less than the detected temperature, and the output a high value (e.g., binary high or VDD volts) when the comparison value is greater than the detected temperature. The DTS 70 outputs a single level comparison signal, which is a result of comparing the comparison value to the detected temperature, to the binary search logic 85 of the sample and hold logic 80.

The binary search logic 85 is configured to step through a predefined number of comparison values during the calibration measurement. In embodiments, eight comparison values are used, although any desired number of comparison values may be used within the scope of the invention. The binary search logic 85 generates each next comparison value based on: the previous comparison value, a control shift register 90, and the output of the DTS 70. As the result of each comparison, the output of the DTS 70 will cause the step of the next comparison to remain or invert. When all steps have been completed, a completion bit latch 95 is set and held. In embodiments, the completion bit latch 95 forces a permanent hold on a final comparison value stored in a comparison value register 97, and transfers control of the DTS 70 from the sample and hold logic 80 to the normal (e.g., operational) system control interface (e.g., other logic 30), which obtains the final comparison value from a comparison value register 97 at a later time after the remainder of the chip has been powered on.

Figure 4:
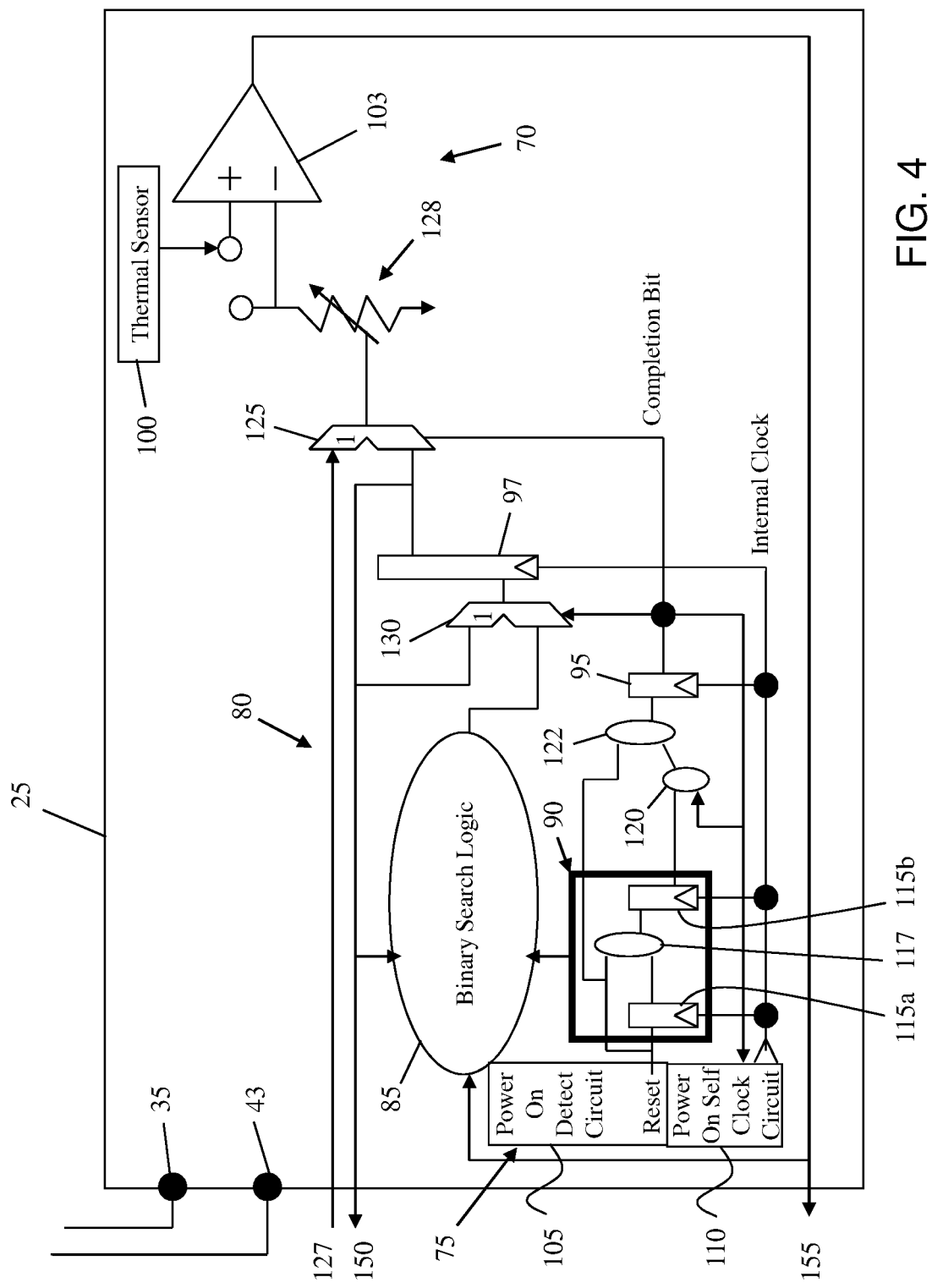
FIG. 4 shows a circuit in accordance with aspects of the invention.

FIG. 4 shows a circuit in accordance with aspects of the invention. In particular, FIG. 4 shows an implementation of the thermal sensor circuit 25 in accordance with additional aspects of the invention. In embodiments, the thermal sensor circuit 25 comprises the DTS 70, which includes a thermal sensor 100 and thermal sensor comparator 103. The thermal sensor circuit 25 also comprises the generator 75, which includes a power on detect circuit 105 and a power on self clock circuit 110. The thermal sensor circuit 25 also comprises the sample and hold logic 80, which includes the binary search logic 85, control shift register 90, and completion bit latch 95. The thermal sensor circuit 25 is electrically connected to the power interconnect 35 and ground interconnect 43.

In accordance with aspects of the invention, immediately upon power being applied to the power interconnect 35, the power on detect circuit 105 generates a power on reset signal to the control shift register 90 and completion bit latch 95. The power on reset signal is active for a duration that is sufficient to force an initial state of the logic latches 115a-b in the control shift register 90 and the completion bit latch 95, and additionally to permit the thermal sensor 100 and thermal sensor comparator 103 to stabilize electrically. Any suitable duration of the power on reset signal may be used within the scope of the invention, and may be achieved through appropriate programming/logic of the power on detect circuit 105.

In embodiments, the power on self clock circuit 110 produces an internal clock oscillation of sufficient duration to allow the latches 95 and 115a-b to update. The internal clock oscillation is of sufficient duration to additionally to permit the thermal sensor 100 and thermal sensor comparator 103 to respond to a change in the comparison value.

According to aspects of the invention, the control shift register 90 shifts a value singly through with each internal clock pulse. In embodiments, the control shift register 90 comprises logic 117 that forces the input to latch 115b to zero when the reset is active, and otherwise forces the input to latch 115b to reflect the value of the preceding latch 115a. Logic 120 is a logical OR of the preceding latch and the completion bit latch 95. Logic 122 forces the input to the completion bit latch 95 to zero when the reset is active, and otherwise causes the input to the completion bit latch 95 to reflect the value of the Logic OR 120. For example, the value of the control shift register 90 is b"1000_0000" after the power on reset, and becomes b"0100_0000" after the first internal clock pulse. On a subsequent internal clock pulse, the value in the control shift register 90 is changed to b"0010_0000". With the final shift, the control shift register 90 has a value of b"0000_0000" and the completion bit latch 95 is changed from b"0" to b"1". In embodiments, there are no additional changes in these latches for subsequent oscillations on the internal clock. Alternatively, the circuit may be configured such that the value of the completion bit latch forces the internal clock to stop oscillating.

Still referring to FIG. 4, and in accordance with aspects of the invention, a first multiplexor 125 is arranged between the thermal sensor comparator 103 and both a chip logic comparison value input 127 and the comparison value register 97. The first multiplexor 125 is operatively connected to a variable resistor 128 to generate a comparison value voltage that is input to the thermal sensor comparator 103. In embodiments, a second multiplexor 130 is arranged on the input side of the comparison value register 97 to maintain, e.g., hold, its contents with the setting and holding of the completion bit latch 95. The first multiplexor 125 is configured such to select between the chip logic comparison value input 127 and the comparison value register 97 based on the value the completion bit latch 95. After the setting of the completion bit latch 95 (e.g., after calibration), the chip logic comparison value input 127 is selected by the first multiplexor as the input to the thermal sensor comparator 103.

As shown in FIG. 4, the binary search logic 85 is arranged between the control shift register 90 and the second multiplexor 130. In embodiments, the binary search logic 85 has three inputs: (i) the power on reset to force initial latch conditioning; (ii) the control shift register 90; and (iii) output of the thermal sensor comparator 103. In implementations, the binary search logic 85 generates the comparison value in response to the output received for the given value from the control shift register 90. For example, when the control shift register 90 contents are b"1000_0000" and the thermal sensor comparator 103 output is b"0", then the next comparison value is b"1100_0000" with the updated control shift register 90 value of b"0100_0000". As another example, when the final comparison value to the thermal sensor comparator 103 is b"1100_1001" given the control shift register 90 value is b"0000_0001" and additionally given the output from the thermal sensor comparator 103 is b"1", then the final comparison value is held at b"1100_1000".

FIG. 4 also shows inputs and outputs of the thermal sensor circuit 25 that are used after calibration. During operation of the chip after calibration, a first input to the thermal sensor comparator 103 is generated by the thermal sensor 100 based upon the temperature of the chip, and a second input to the comparator 103 is generated based on a chip logic comparison value input 127 to the thermal sensor circuit 25. As such, the chip logic comparison value input 127 represents an operational (e.g., post-calibration) system input to the DTS 70 used during a sample to determine a temperature at any given time, for example to determine if an over-threshold condition exists. As also shown in FIG. 4, the thermal sensor circuit 25 comprises a calibration result output 150, which is an observation data point for the chip to gather and send the resulting temperature obtained from the initial sample taken by the DTS 70 powering up. As additionally shown in FIG. 4, the thermal sensor circuit 25 comprises a comparator result output 155, which is used in operational mode (e.g., after calibration) to indicate whether the chip logic comparison value input 127 is higher or lower than the voltage generated by the temperature detected by the thermal sensor 100.

As described above with respect to FIGS. 1-4, and in accordance with aspects of the invention, the thermal sensor circuit 25 is contained in the chip and initiates the calibration measurement immediately upon power being applied to the isolated power interconnect 35. By forming the self-clock and binary search logic on the chip, the thermal sensor circuit 25 is self-contained and does not rely on external logic to perform the calibration. This, in turn, minimizes the time it takes to perform the calibration measurement. Other embodiments of the invention are not limited to complete isolation from external logic, however, and such embodiments may be configured to utilize external stimulus to an extent necessary for performing a calibration. In embodiments, the self-contained aspect of the thermal sensor circuit 25 coupled with a speed at which the calibration is performed permits the calibration to be completed in a time less than the thermal time constant of silicon. For example, in implementations, the binary search logic 85 may be clocked in nanoseconds, which produces a calibration result in microseconds, which is less than the thermal time constant of silicon which is on the order of milliseconds. In this manner, even if there is some degree of self heating in another location of the wafer, the thermal sensor circuit performs the calibration sufficiently fast that the self heating does not have time to travel to the thermal sensor to affect the calibration.

Figure 5:
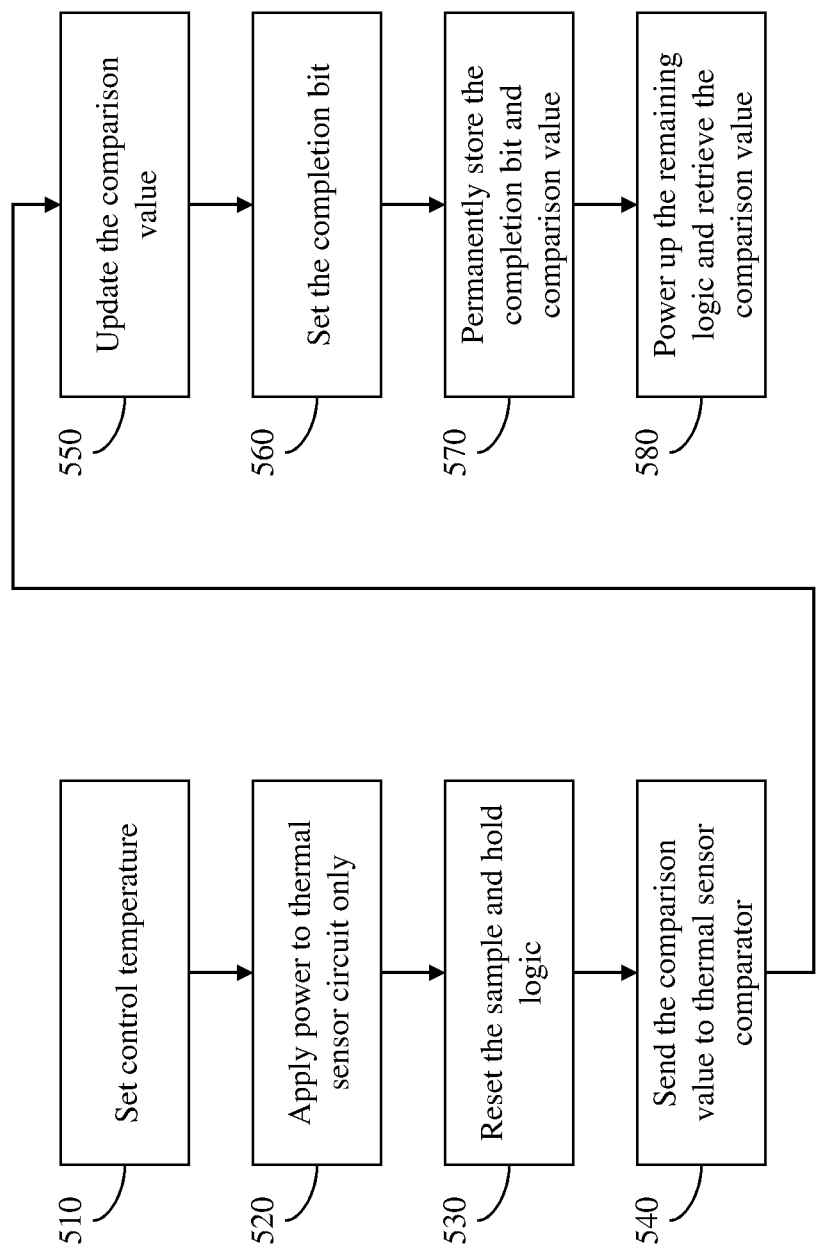
FIG. 5 shows a flow diagram depicting a process in accordance with aspects of the invention.

FIG. 5 shows a flow diagram depicting a process in accordance with aspects of the invention. The steps of the process shown in FIG. 5 may be carried out using the system shown in FIGS. 1-4. At step 510, a wafer containing a die containing an on-die DTS (e.g., thermal sensor circuit 25) is set to a control temperature. Step 510 may be performed, for example using a wafer test apparatus comprising a wafer-holding chuck, chamber, or heat sink that is set to the control temperature.

At step 520, power is applied only to the thermal sensor circuit, without applying power to other logic in the wafer. In embodiments, the power is selectively applied to the thermal sensor circuit using isolated interconnects (e.g., interconnects 35) and test equipment (e.g., test equipment 45).

At step 530, the sample and hold logic (e.g., sample and hold logic 80) is reset. In embodiments, a power on detect circuit (e.g., power on detect circuit 105) generates a power on reset signal to the control shift register (e.g., control shift register 90) and the completion bit latch (e.g., completion bit latch 95).

At step 540, the binary search logic generates and sends a comparison value to the thermal sensor comparator, and the thermal sensor comparator compares this value to a detected temperature from the thermal sensor. The output of the thermal sensor comparator is sent back to the binary search logic.

At step 550, the Binary Search Logic updates the comparison value based on the output of the thermal sensor comparator, the control shift register value, and the previous comparison value.

Steps 540 and 550 are repeated until the control shift register clears. When the control shift register clears, the completion bit is set at step 560. At step 570, the completion bit and the comparison value are permanently stored. The setting of the completion bit transfers control of the thermal sensor circuit to the other logic in the chip.

At step 580, the remaining logic in the chip is powered on and the comparison value is retrieved. Temperature detection is performed during operation of the chip by supplying chip logic comparison value input (e.g., chip logic comparison value input 127) to the thermal sensor comparator, which compares the chip logic comparison value input to the temperature detected by the thermal sensor and generates a result.

Figure 6:
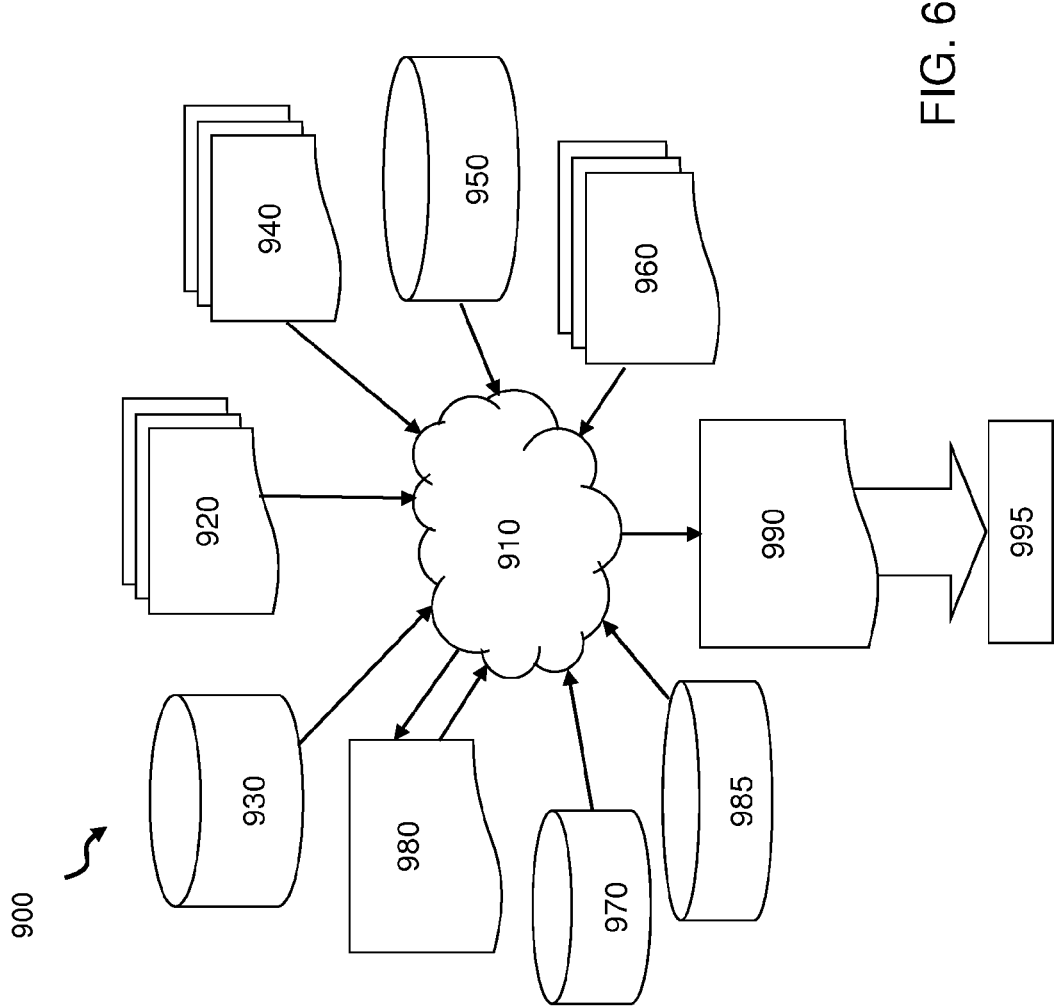
FIG. 6 is a flow diagram of a design process used in semiconductor design, manufacture, and/or test.

FIG. 6 is a flow diagram of a design process used in semiconductor design, manufacture, and/or test. FIG. 6 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-4. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-4. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-4 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-4. In one embodiment, design structure 990 may comprise a compiled, executable HDL simulation model that functionally simulates the devices shown in FIGS. 1-4.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-4. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method of calibrating a thermal sensor, comprising:
   setting a wafer to a control temperature, wherein the wafer comprises the thermal sensor and other chip logic;
   applying power exclusively to a thermal sensor circuit comprising the thermal sensor;
   calibrating the thermal sensor;
   storing a calibration result;
   retrieving the calibration result upon application of power to the other chip logic;
   shifting control of the thermal sensor from a thermal sensor calibration circuit to the other chip logic, wherein the thermal sensor calibration circuit is comprised in the thermal sensor circuit, and wherein the shifting control comprises setting a completion bit latch.

2. The method of claim 1, the application of power to the other chip logic occurs after the calibrating the thermal sensor.

3. The method of claim 1, further comprising performing the shifting control after the calibrating the thermal sensor.

4. The method of claim 1, further comprising permanently holding the completion bit latch and the calibration result.

5. The method of claim 1, further comprising performing the calibrating the thermal sensor immediately after the applying power to the thermal sensor circuit.

6. The method of claim 1, wherein:
   the thermal sensor circuit comprises a self clock and a thermal sensor calibration circuit; and
   the calibrating the thermal sensor is performed using the self clock and the thermal sensor calibration circuit.

7. The method of claim 1, wherein the calibrating the thermal sensor comprises comparing a detected temperature to at least one comparison value.

8. The method of claim 7, wherein the at least one comparison value comprises a plurality of comparison values.

9. A method of calibrating a thermal sensor, comprising:
setting a wafer to a control temperature, wherein the wafer comprises a die that comprises the thermal sensor, a thermal sensor circuit, and other chip logic;
applying power exclusively to the thermal sensor circuit;
resetting sample and hold logic contained in the thermal sensor circuit;
comparing a plurality of comparison values to a temperature detected by the thermal sensor;
setting a completion bit after performing the comparing;
storing the completion bit and one of the plurality of comparison values;
applying power to the other chip logic; and
retrieving the one of the plurality of comparison values.

10. The method of claim 9, further comprising performing the applying power to the other chip logic after the storing the completion bit and the one of the plurality of comparison values.

11. The method of claim 10, wherein the retrieving the one of the plurality of comparison values is performed by the other chip logic after the applying power to the other chip logic.

12. The method of claim 11, further comprising clocking the comparing using a clock comprised in the thermal sensor circuit.

13. The method of claim 12, further comprising performing the resetting and the comparing immediately after the applying power to the thermal sensor circuit.

14. A method, comprising:
setting a wafer to a control temperature, wherein the wafer comprises a die that comprises the thermal sensor, a thermal sensor circuit, and other chip logic;
applying power exclusively to the thermal sensor circuit;
resetting sample and hold logic contained in the thermal sensor circuit;
comparing a plurality of comparison values to a temperature detected by the thermal sensor;
setting a completion bit after performing the comparing;
storing the completion bit and one of the plurality of comparison values;
applying power to the other chip logic; and
retrieving the one of the plurality of comparison values.

15. The method of claim 14, further comprising performing the applying power to the other chip logic after the storing the completion bit and the one of the plurality of comparison values.

16. The method of claim 15, wherein the retrieving the one of the plurality of comparison values is performed by the other chip logic after the applying power to the other chip logic.

17. The method of claim 16, further comprising clocking the comparing using a clock comprised in the thermal sensor circuit.

18. The method of claim 17, further comprising performing the resetting and the comparing immediately after the applying power to the thermal sensor circuit.

* * * * *